United States Patent
Nagappan et al.

(10) Patent No.: US 11,244,034 B1
(45) Date of Patent: Feb. 8, 2022

(54) IDENTITY AND ACCESS MANAGEMENT FOR HUMAN MACHINE INTERFACE APPLICATIONS OF INDUSTRIAL CONTROL SYSTEMS

(71) Applicant: Amazon Technologies, Inc., Seattle, WA (US)

(72) Inventors: Ramesh Nagappan, Needham Heights, MA (US); Jitender Arora, Westford, MA (US)

(73) Assignee: Amazon Technologies, Inc., Seattle, WA (US)

( * ) Notice: Subject to any disclaimer, the term of this patent is extended or adjusted under 35 U.S.C. 154(b) by 58 days.

(21) Appl. No.: 16/443,537

(22) Filed: Jun. 17, 2019

(51) Int. Cl.
*G06F 21/31* (2013.01)
*H04L 29/06* (2006.01)
*H04L 29/08* (2006.01)
*H04L 9/32* (2006.01)

(52) U.S. Cl.
CPC .................. *G06F 21/316* (2013.01)

(58) Field of Classification Search
CPC .................................................. G06F 21/316
See application file for complete search history.

(56) References Cited

U.S. PATENT DOCUMENTS

| | | | | |
|---|---|---|---|---|
| 2013/0232541 | A1* | 9/2013 | Kapadia | G06F 21/40 726/1 |
| 2016/0182544 | A1* | 6/2016 | Adjaoute | G06F 21/577 705/7.15 |
| 2018/0026954 | A1* | 1/2018 | Toepke | H04L 63/083 726/4 |
| 2019/0102162 | A1* | 4/2019 | Pitre | H04L 63/10 |
| 2020/0076806 | A1* | 3/2020 | Nassar | H04L 63/102 |

* cited by examiner

*Primary Examiner* — Noura Zoubair
(74) *Attorney, Agent, or Firm* — Patterson + Shendan, LLP (57) ABSTRACT

Techniques for performing identity and access management for an equipment-specific human machine interface (HMI) are provided. One technique includes detecting via a HMI application configured to control an equipment a request from a user agent to access a configuration of the equipment. In response to the detection, the request is re-directed from a first authentication mechanism used by the HMI application to control access to the equipment to a second authentication mechanism provided by an identity provider. After re-directing the request to the identity provider, it is determined that the user agent has been successfully authenticated using the second authentication mechanism. An access grant then is then provided, via the HMI application, to the user agent in response to the request to access the configuration of the equipment.

20 Claims, 8 Drawing Sheets

IDENTITY AND ACCESS MANAGEMENT FOR HUMAN MACHINE INTERFACE APPLICATIONS OF INDUSTRIAL CONTROL SYSTEMS

BACKGROUND

The present invention generally relates to identity and access management techniques, and more specifically, to techniques for identity and access management for human machine interface (HMI) applications used by industrial control systems.

Many companies store, package, and ship items and/or groups of items from different types of facilities (e.g., warehouse, plant, distribution center, storehouse, factory, etc.). These various activities and the overall flow or movement of items within the facility (e.g., from receiving the item(s) to storing the item(s), from storing the item(s) to shipping the item(s), etc.) is often labor intensive. Consequently, facilities often employ various types of equipment or tools from different manufacturers (or vendors) to aid these material handling processes. Each tool is managed and controlled via a customized and proprietary application that is provided by the tool manufacturer.

Currently, the authentication and authorization techniques used by these applications are fairly limited. For example, the techniques generally rely on limited set of user accounts with varying permissions (e.g., administrator, maintenance, operator) configured by the tool manufacturer for the specific tool to authenticate and authorize access to the tool. Performing authentication and authorization in this manner increases the complexity of managing the various types of equipment in a facility, increases the likelihood and duration of equipment shutdowns, and increases the security risk to the facility.

BRIEF DESCRIPTION OF DRAWINGS

Various embodiments in accordance with the present disclosure will be described with reference to the drawings, where like designations denote like elements.

DETAILED DESCRIPTION

Facilities generally employ various material handling equipment (MHE) (also referred to herein as tools, equipment, devices, machines, systems, etc.) to aid in facility operations. For example, an order fulfillment center that houses inventory for an online retailer may use a conveyor belt system to transition items to different locations within the fulfillment center, a sorter to divert and singulate items, label print and apply devices, case sealers, scanners, and so on. These different various tools are controlled via proprietary and customized human machine interfaces (HMIs) provided by the tool manufacturers. The HMIs, for example, can include, but are not limited to, web interfaces, applications on handheld devices (e.g., phones, tablets, etc.), console access, etc.

One issue with proprietary HMIs is that they use locally hosted native authentication processes to control access to the tools. In these authentication processes, the tool manufacturer may configure a limited set of accounts (with varying levels of permissions), where credentials (e.g., passwords) for each account are shared across a wide range of users. For example, a HMI for a sorter machine in a facility may be configured with an administrator account, a maintenance account, and an operator account, where the credentials (e.g., username, password) for each account are shared across multiple users. Using the credentials for one of the accounts, a user can access the tool to change configuration parameters, such as on/off control, rate, direction of flow, remote start/stop functionality, etc.

However, this means of access control exposes the tools within a facility to configuration to security risks, increases the likelihood of equipment failures, increases the duration of the downtime in equipment failures, etc. Using the sorter machine as a reference example, a malicious user can access the sorter (e.g., using one of the shared username/passwords) to run the sorter backwards, change the run state of the sorter, move a calculated field device location, modify error-handling logic, and the like, in order to significantly impact facility operations. In another example, a user (without malicious intent) can unintentionally make an erroneous configuration change to an equipment (e.g., modifying a run state of the sorter) that causes a significant amount of downtime in the facility. In yet another example, an equipment can be remotely run (e.g., with remote start and stop functionality) without knowledge of other users in the facility.

Further, facilities currently do not have ability to account for the various users that are accessing tools in the facility. This is due, in part, to HMIs lacking logging and auditing capability for individual users. As a result, it is possible for multiple users to log into an HMI for a tool at the same time and make configuration changes. In each of these examples, any user with knowledge of HMI passwords can access multiple equipment features that have an impact on the performance of the equipment, and in turn, the facility.

To address such issues, embodiments herein describe improved techniques for identity and access management for HMIs used by tools within a facility. In particular, embodiments provide an interface agent that performs, on behalf of an equipment-specific (or tool-specific) HMI application, identity and access management of a user and/or device interacting with the equipment-specific HMI application. The interface agent performs identity and access management with another computing system (e.g., an identity provider system) in order to provide identity-based access control for the equipment-specific HMI application (e.g., as opposed to an access control method based on shared usernames/passwords).

In one embodiment, the interface agent can be installed on the equipment-specific HMI application to monitor for access attempts by a user agent to the equipment. The user agent, for example, can include a user or a user device. In one example, the installation of the interface agent creates application programming interface (API) hooks to the equipment-specific HMI application to monitor events that occur on the equipment-specific HMI application. The interface agent, via the hook, can detect an access attempt by the user agent and re-direct the access attempt to another computing system (e.g., identity provider system) that performs authentication and authorization. The interface agent can interact with various types of identity provider systems (e.g., single sign on identity providers, standard-based identity providers, etc.) using various different protocols (e.g., Lightweight Directory Access Protocol (LDAP), OpenID Connect, Security Assertion Markup Language (SAML), etc.) in order to authenticate the user agent. After determining the user agent is authenticated (e.g., the interface agent may receive a token, which is used to validate the access), the interface agent grants the user agent access to the management and configuration features for equipment. For example, the interface agent can provide an access token to the equipment-specific HMI application, which uses the token to grant the user agent access to the management and configuration features of the equipment. In one embodiment discussed below, the interface agent can also provide, e.g., as part of authorization of the user agent, attributes or policies for the user agent along with the token. The attributes (or policies) of the user agent can be used by the equipment-specific HMI application to determine which management/configuration features the user agent is authorized to access.

In one embodiment, the interface agent can monitor the user agent's activity and access to the configuration features of the equipment to determine whether the user agent's activity is consistent with at least one behavior policy associated with the equipment. For example, if the user agent is accessing configuration parameters for a conveyor belt system that is inconsistent with the user agent's typical access to that conveyor belt system and/or is inconsistent with other peer user agents' access to that conveyor belt system, the interface agent can flag the user agent's behavior for review (e.g., generate an alert). In some cases, the interface agent can generate the one or behavioral policies by analyzing the access patterns of multiple user agents for different equipment over a period of time. For example, the interface agent can collect information, such as the job or role of the user agent, when the equipment was accessed, the duration of the access, etc. In this manner, the interface agent is able to detect anomalous behavior that may be indicative of malicious activity, even if the behavior is not flagged by traditional monitoring tools (e.g., detection of rogue IP, use of stale tokens, etc.).

Note that while many of the following embodiments use an order fulfillment center for an online retailer as a reference example of a type of facility in which the techniques presented herein can be used to provide identity and access management, the techniques presented herein can be used in other types of facilities (e.g., manufacturing facilities, plants, factories, etc.) in other industries. As used herein, a user agent may refer to a user or a device (e.g., user device). For example, identity-based authentication of the user agent may include identity-based authentication of a user, identity-based authentication of a user device, or identity-based authentication of the user and user device. Further, while many of the following embodiments relate to identity-based authentication, embodiments presented herein can also be used for authorization.

Figure 1:
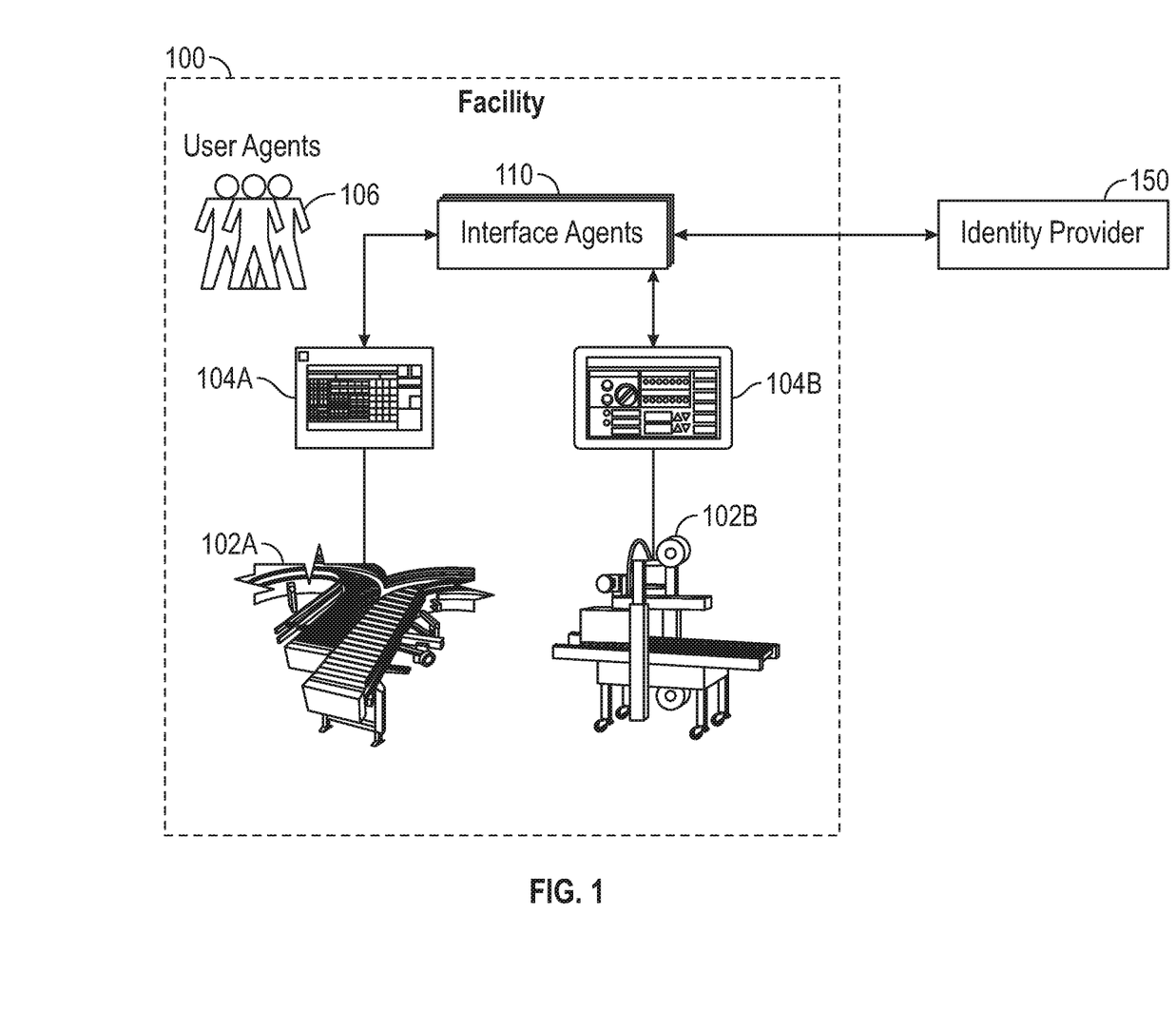
FIG. 1 illustrates an example of multiple interface agents for multiple equipment-specific HMIs interacting with an identity provider, according to one embodiment.

FIG. 1 illustrates an example of multiple interface agents 110 for multiple equipment-specific HMIs 104 interacting with an identity provider 150 to authenticate user agents 106 (e.g., users, devices, etc.) access to the equipments 102, according to one embodiment. As shown, the facility 100 includes multiple equipment (or tools) 102 to aid in material handling processes. In this particular embodiment, the facility 100 includes a first equipment (e.g., conveyor belt system) 102A and a second equipment (e.g., package sealer) 102B. Each equipment 102 is controlled via an HMI 104 that is specifically configured for the equipment 102. For example, the equipments 102A and 102B may be provided by different manufacturers (or vendors) or provided by the same manufacturer. Here, equipment 102A is controlled via HMI 104A and equipment 102B is controlled via HMI 104B. As noted, as used herein, an HMI 104 can include, but is not limited to, a web interface, an application on a handheld device (e.g., phones, tablets, etc.), a console, etc. The HMIs 104A and 104B may provide an interface (e.g., graphical user interface (GUI) or other user interface) that permits the user agent 106 to interact with the equipments 102A and 102B.

Because HMIs 104 are provided for proprietary equipment that is specifically customized for a given facility 100, the HMIs 104 generally employ local authentication methods to control access to the equipments 102. For example, as noted, these authentication methods typically rely on a limited set of accounts configured by the equipment manufacturer (e.g., administrator, operator, maintenance) that are designed to be used by a wide range of users or user devices. As noted, however, this increases the complexity of managing the access to different equipment in the facility 100 and makes the facility 100 more susceptible to malicious attacks.

Instead of relying on local authentication methods to authenticate user agents 106 that attempt to access different equipment 102 in the facility 100, embodiments can use one or more interface agents 100 to provide identity-based access control for the user agents 106 to the equipments 102A and 102B. The interface agent 100 can be a software application executing on a computing system. In one embodiment, the interface agent 100 and the equipment-specific HMI (application) 104 can execute on the same computing system. In another embodiment, the interface agent 100 and the equipment-specific HMI (application) 104 can execute on different computing systems.

The interface agent 100 can implement one or more different authentication and/or authorization protocols, on behalf of an equipment-specific HMI 104 and user agent 106, with the identity provider 150. For example, the interface agent 100 and the identity provider 150 can implement one or more standardized authentication protocols (e.g., OpenID connect, SAML, etc.) to authenticate the user agent 106 attempting to connect to an equipment 102. Additionally, the interface agent 100 and the identity provider 150 can implement one or more standardized authorization protocols (e.g., OAuth2.0, SAML, etc.) in order to authorize the user agent attempting to connect to an equipment 102. The identity provider 150 may include one or more computing systems (e.g., in a cloud) that provide user/device authentication and/or user/device authorization as a service. The identity provider 150 can include a single sign on identity provider, a standard-based identity provider (e.g., SAML identity provider, OpenID provider), etc.

Figure 2:
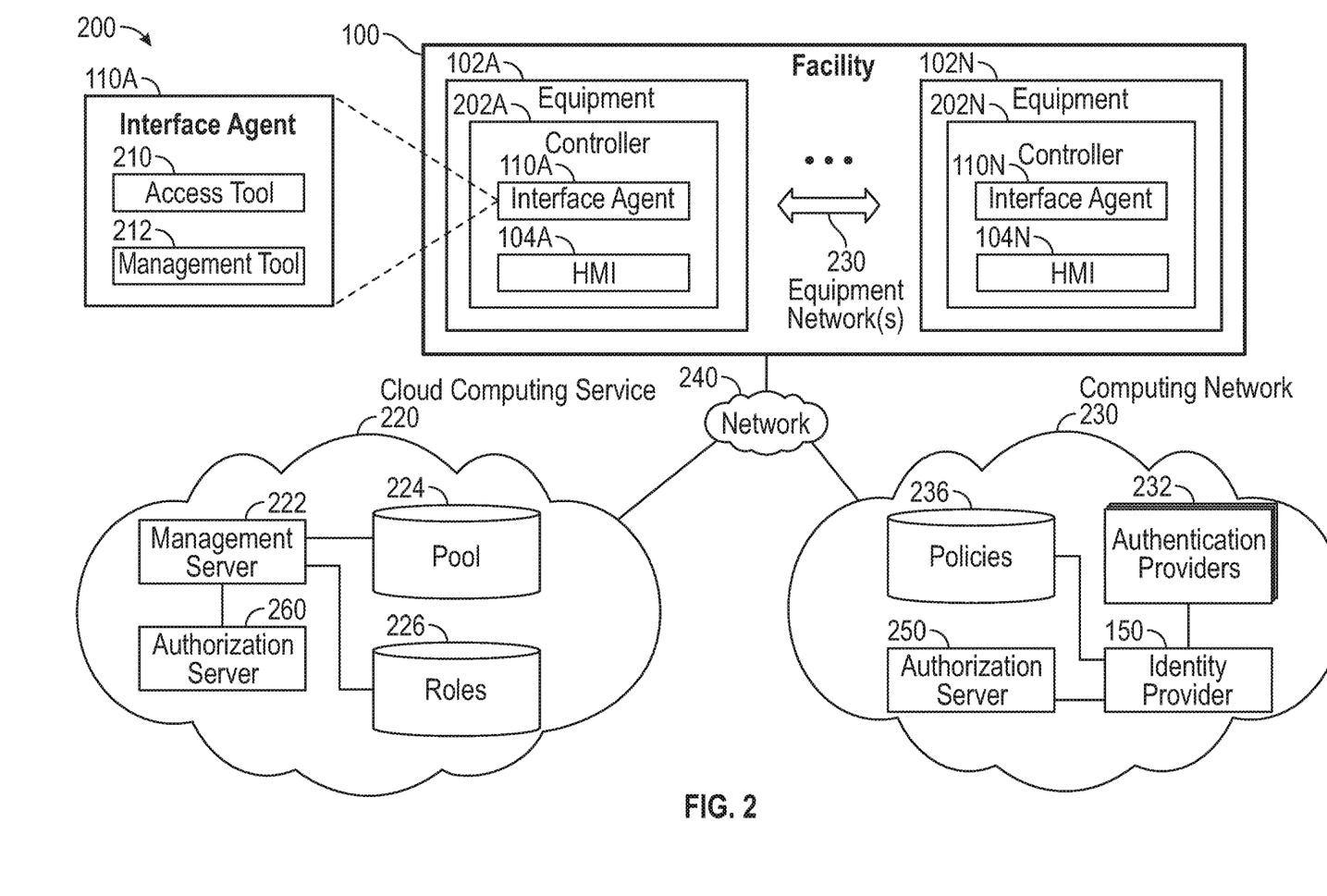
FIG. 2 is a block diagram of an example network architecture for performing identity and access management for one or more equipment-specific HMIs, according to one embodiment.

FIG. 2 is a block diagram of an example network architecture 200 for performing identity and access management for one or more equipment-specific HMI applications, according to one embodiment. The network architecture 200 includes a facility 100, a computing network 230, and a cloud computing service 220, which are interconnected via a network 240. Network 240, in general, is representative of a local area network (LAN) (e.g., Ethernet), wide area network (WAN), wireless LAN (WLAN), personal area network (PAN), cellular network, etc. In one embodiment, the network 240 is the Internet.

The facility 100 includes multiple equipment 102 A-N, which are representative of different tools, systems, machines, etc., used to aid processes (e.g., material handling processes) in the facility 100. As noted, in the case of an order fulfillment center, the equipments 102 can include conveyor belts, sorters, labeling equipment, singulation devices, package sealers, robotics, etc. Each equipment 102 includes a controller 202 (e.g., controller 202A, controller 202N, etc.) that controls the operation of the equipment. For example, using the controller 202, a user can make configuration changes to a particular equipment (e.g., on/off control, change operating parameters, troubleshoot the equipment, etc.). The controller 202 may be solely hardware and firmware or can include combinations of hardware and software elements. In one particular embodiment, the controller 202 is a programmable logic controller (PLC).

Each controller 202 includes an interface agent 110 (e.g., interface agent 110A for controller 202A, interface agent 110N for controller 202N) and a HMI 104 (e.g., HMI 204A for controller 202A, interface 204N for controller 202N). The HMI 104 may include a graphical user interface, web interface, mobile application, touch-screen interface, display, console, etc., that permits the user to interact with the controller 202. For example, in one embodiment, the HMI 104 may permit the user agent 106 to modify one or more configuration settings of the equipment 102. Although not shown, in some embodiments, the HMI 104 and/or controller 202 may be operable to receive input (or commands) from one or more input/output (I/O) devices (e.g., a keyboard, mouse, etc.) and/or another computing system (e.g., using remote access capability).

The equipment(s) 102 may communicate with other equipment(s) 102 in the facility 100 via one or more equipment network(s) 230. The equipment network(s) 230 are generally communication networks that implement proprietary communication protocols specific to different equipment manufacturers. For example, in one embodiment, the equipments 102 in the facility 100 that are provided by a same manufacturer may communicate via the same equipment network 230. That is, the facility 100 may include a different equipment network 230 for each set of equipments 102 provided by a different manufacturer. In another embodiment, the facility 100 may include at least one equipment network 230 over which equipments 102 that belong to different equipment manufacturers can communicate. The equipment network(s) 230 can include wired communication networks, wireless communication networks, or a combination of wired and wireless communication networks. In one embodiment, the communication interfaces between the equipments 102 can be based on a serial interface (e.g., Recommended Standard (RS)-232, RS-422, RS-423, RS-485, Ethernet, and/or variants thereof).

As shown, each interface agent 110 includes an access tool 210 and a management tool 212. The access tool 210 and the management tool 212 may include software components. The access tool 210 monitors events that occur on the HMI 104, in order to detect access attempts by user agents 106 to the controller 202 for the equipment 102. For example, once the interface agent 110 is installed (e.g., as a plug-in) on the HMI 104, one or more API hooks are created that enable the access tool 210 to monitor the events on the HMI 104. When an access attempt is detected, via a hook, the access tool 210 can invoke a sub-routine (or function) that re-directs the access attempt to another computing system (e.g., computing network 230, cloud computing service 220, etc.) that provides identity-based authentication and/or authorization as a service. In one embodiment, the sub-routine invoked by the API hook can use one of multiple communication protocols to re-direct the request, based in part on a type of access attempt by the user. For example, the communication protocol may be a certificate-based status communication protocol (e.g., Online Certificate Status Protocol (OCSP)) if the access attempt is from a computing device of the user. In another example, the communication protocol may be a connectionless communication protocol if the access attempt is from an Internet-of-Things (IoT) device used by the user. In yet another example, the communication protocol may be based on Hypertext Transfer Protocol (HTTP) if the access attempt is directly from the user.

The access tool 212 can exchange messages with other computing systems (e.g., identity provider 150, management server 222, authorization server 250, authorization server 260, etc.) in order to implement an authentication protocol and/or authorization protocol. In one embodiment, the access tool 212 also enables the HMI 104 to authenticate the user agent 106, based on user-specific credentials (e.g., as opposed to shared credentials). That is, each user agent 106 can be assigned credentials (e.g., username/password, or other identifier) that are uniquely associated with the user agent 106. The access tool 212 and/or the identity provider 150 can validate the unique credentials, using a single ground truth (e.g., corporate (facility) directory, such as a facility LDAP system) that applies to the facility's security policies. In this manner, the access tool 212 enables the HMI 104 to avoid the use of shared credentials for authentication.

The management tool 212 monitors the user agent's activity and access pattern to equipments 102 (e.g., when and how the user agent 106 is accessing a particular equipment 102). In one embodiment, the management tool 212 can log activity (or events) that occurs on a particular equipment 102 and use the information collected to generate a behavioral policy. For example, the management tool 212 can identify and collect, for a given user agent 106, at least one of a type of user access, sensitivity of different equipment 102 (e.g., how a particular equipment behaves in response to a configuration change), when an equipment 102 is accessed, the particular users that access an equipment 102, job or role of the user accessing the equipment 102, access of the user to the equipment compared to peer users' access to the equipment 102, the configuration of the device used to access the equipment 102 (e.g., whether the device is a memory constrained device, browser-device, non-browser device), the device changes from user to user, whether the device used to access the equipment is a sanctioned device or unsanctioned device, geographical location of the access attempt (e.g., whether the user agent is in the facility 100), etc.

In one embodiment, the management tool 212 may use this information to detect anomalous behavior from a user agent 106 that may be indicative of malicious activity (e.g., whether the user's activity or access is consistent with the behavioral policy, whether the user device is a sanctioned user device and in an authorized geographical location, etc.). For example, the management tool 212 can determine whether the configuration settings the user agent 106 is accessing and whether the changes the user agent 106 is making to the equipment 102 are consistent with the behavioral policy. In some cases, the management tool 212 can also use the collected information to also detect other potential malicious activity, such as whether the user agent 106 is using compromised credentials, lateral movement, and other malicious activity. In this manner, when the user agent 106 starts to behave in a way that is unusual or unlikely (even if it is not flagged by traditional perimeter monitoring tools), the management tool 212 can flag the behavior, determine whether it is anomalous, and trigger further investigation if needed (e.g., by generating and sending an electronic notification (or alert)).

The computing network 230 includes the identity provider 150, one or more authentication providers 232, policies 236, and an authorization server 250. In one embodiment, the computing network 230 can be a locally hosted network (e.g., local to the facility 100). In this embodiment, the certificate credentials and/or keys used for authentication of a user agent 106 are locally issued by the computing network 230. In another embodiment, the computing network 230 is a remote network. The identity provider 150 performs authentication of the user, based on one or more authentication protocols (e.g., OpenID connect, SAML, etc.). For example, assuming authentication of the user agent 106 is successful, the identity provider 150 can return an authentication token (or access token) to the interface agent 110 that can be used to grant the user agent 106 access to the HMI 104. In one embodiment, the identity provider 150 can also interact with the authorization server 250 to retrieve attributes (or claims) of the user agent that are used for authorization of the user agent. For example, the authentication token generated by the identity provider 150 can be compliant with an authorization protocol, such has OAuth2.0, SAML, etc. The authentication token can include one or more attributes, examples of which can include, but are not limited to, user role, user/device location, user preferences, device preferences, and so on. These attributes can be provided to the HMI 104, which uses the attributes for downstream authorization and entitlement decisions (e.g., determining which configuration(s) the user agent is authorized to access/modify). Note that although FIG. 2 depicts the authorization server 250 and the identity provider 150 as separate, in some embodiments, the authorization server 250 and the identity provider 150 can be a single entity.

In some embodiments, the identity provider 150 can interact with one or more authentication providers 232 to provide additional layers of authentication. For example, the one or more authentication providers 232 can include multi-factor authentication (MFA) providers (or systems). MFA can include two factor authentication (also known as two-step authentication or two-step verification). In two factor authentication, the user agent 106 is granted access to a resource (e.g., equipment 102) after successfully presenting two pieces of evidence (or factors) to the authenticator. In one embodiment, for example, the two pieces of evidence can include a user-controlled password that is supplemented with a one-time password (OTP) or code generated or received by an authenticator that only the user possesses. In one example, the OTP is based on a standard (e.g., the Time Based One-Time Password (TOTP) Algorithm). The authenticator that generates the OTP can include an authenticator application on the user's device (e.g., smartphone).

In some embodiments, the identity provider 150 can interact with the policies 236 to determine whether a user agent 106 is associated with the facility 100. The policies 236, in general, can include the facility's active directory (AD) and/or LDAP where users, groups, and permissions are defined. The identity provider 150 can access the policies 236, for example, to determine if a user agent 106 that is attempting access to a particular equipment 102 belongs to one of the users or groups in the AD. In another example, the identity provider 150 can determine whether the permissions of the user agent 106 (identified in the policies 236) are consistent with a type of access requested by the user agent 106 to the equipment 150. The policies 236, thus, represent a single source of ground truth, from which authentication of a user agent 106 can be performed.

The cloud computing service 220 enables the facility 100 to authenticate external user agents (e.g., users/devices that are not within the facility's AD/LDAP) to access equipment 102 within the facility 100. In this embodiment, the cloud computing service 220 includes a management server 222, a pool 224, roles 226, and authorization server 260. The management server 222 can include one or more physical computing systems. Similarly, each of the pool 224 and roles 226 can include one or more different storage locations within the cloud computing service 220. As discussed below in more detail with regard to FIG. 4, the management server 222 can be used to perform authentication/authorization with the identity provider 150 on behalf of external user agents 106. The management server 222 can access the user pools 224, which maintain a directory of the external user agents, and user roles 226, which maintain a directory of roles/permissions of the external user agents, for authentication. The management server 222 can also interact with the authorization server 260 to provide attributes that are used by the HMI 104 for authorization decisions. For example, assuming authentication of the user agent 106 is successful, the management server 222 can receive an authentication token from the identity provider 150. The management server 222 can generate an access token that includes attributes of the user agent 106 (from the authorization server 260) and send the access token (with the attributes) to the interface agent 110.

Figure 3:
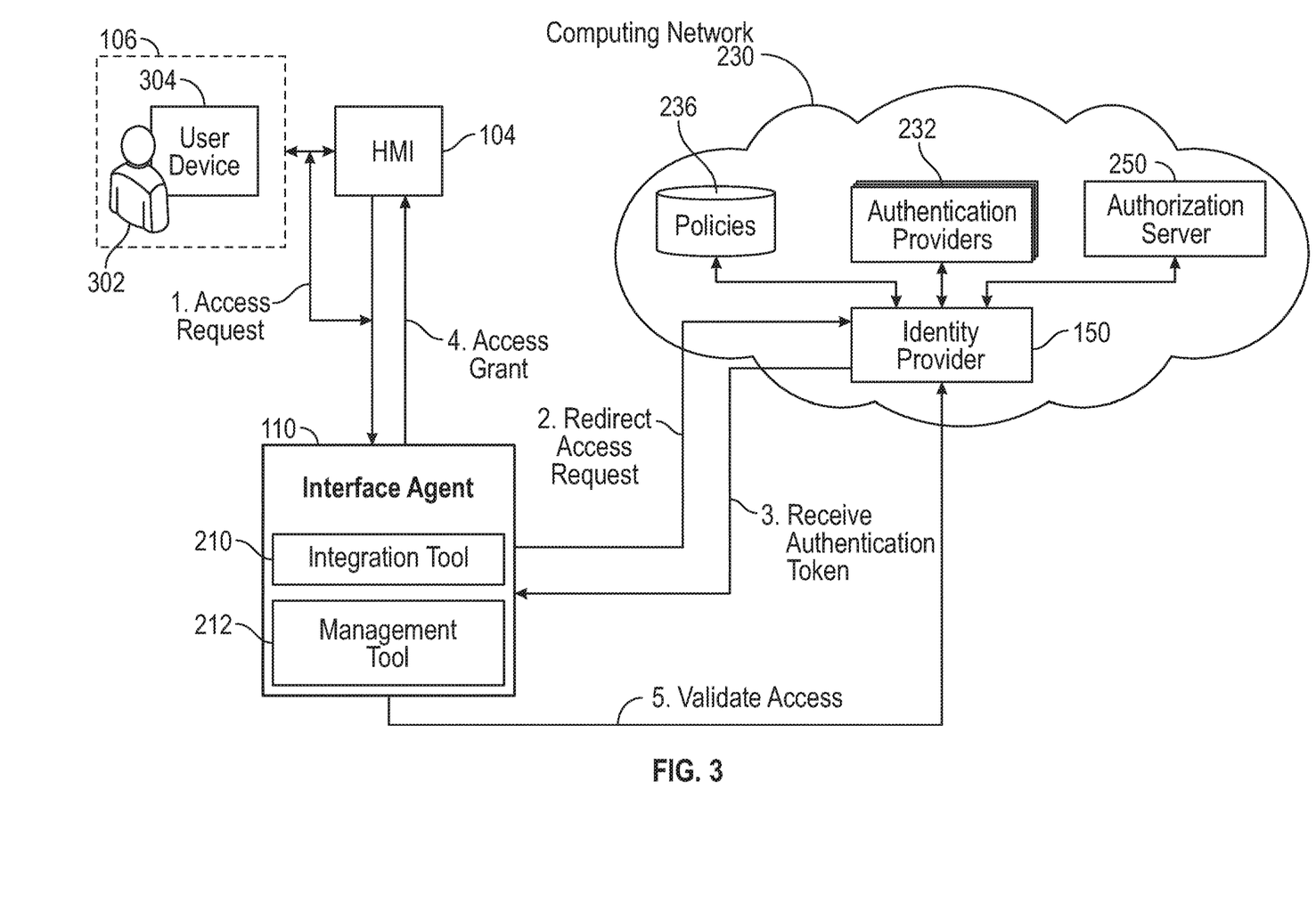
FIG. 3 is a block diagram of an example workflow for performing identity-based authentication for an equipment-specific HMI, according to one embodiment.

FIG. 3 is a block diagram of an example workflow for performing identity-based authentication for an equipment-specific HMI, according to one embodiment. In this particular embodiment, the user agent 106 may be a user 302 associated with the facility 100 (e.g., an employee of the facility 100) and/or a user device 304 used by the user 302. In some cases, the user 302 may interact directly with the HMI 104. In other cases, the user 302 may interact with the HMI 104 via the user device 304. The user device 304, for example, may include a tablet, mobile device, handheld scanner, and the like. The user device 304 may display actions (associated with a given equipment 102) on a user interface that enable the user 302 to interact with the equipment 102 via the HMI 104. Here, the user agent 106 interacting with an HMI 104 for a specific equipment 102 may request access to the equipment 102, via the HMI (step 1). As discussed above, in one embodiment, the interface agent 110 enables the user agent 106 to request access to the equipment 102 with unique user credentials (e.g. specific to the user 302), as opposed to shared credentials associated with a multi-user account (e.g., administrator, operator, maintenance).

At step 2, the interface agent 110 redirects the user agent's access request to the identity provider 150. Depending the particular authentication protocol implemented by the identity provider 150, the identity provider 150 may exchange one or more messages with the interface agent 110 and/or other computing systems in order to authenticate the user agent 106. For example, assuming the authentication protocol is OpenID connect, the (authorization endpoint) of the identity provider 150 may authenticate the end-user agent 106 using information (e.g., a client ID) supplied in the access request. The authorization endpoint may return an authorization code to the interface agent 110, which in turn can use the authorization code to retrieve one or more tokens. In a particular example, the interface agent 110 can send the authorization code, the client ID, and a client secret in order to retrieve the ID token, access token, and refresh token. Here, for example, at step 3, the interface agent 110 receives an authentication token (e.g., ID token, access token, and/or refresh token). In some cases, the interface agent 110 can also prompt the user for MFA credentials (e.g., OTP) in response to a query for the MFA credentials from the identity provider 150 (and/or the authentication provider 232). The authentication token returned at step 3 may be compliant with an authorization protocol, such as OAuth2.0. That is, the authentication token may additionally include user agent attribute (or claims), that can be used for authorization decisions. At step 4, the interface agent 110 validates the authentication token and submits an access grant (including the attributes) to the HMI 104, which uses the access grant to allow the user agent 106 to access the equipment 102. At step 5, the interface agent 110 can validate the access to the equipment 102 by, e.g., verifying that the token is still valid, the user is listed in the AD (e.g., in policies 236), etc.

Figure 4:
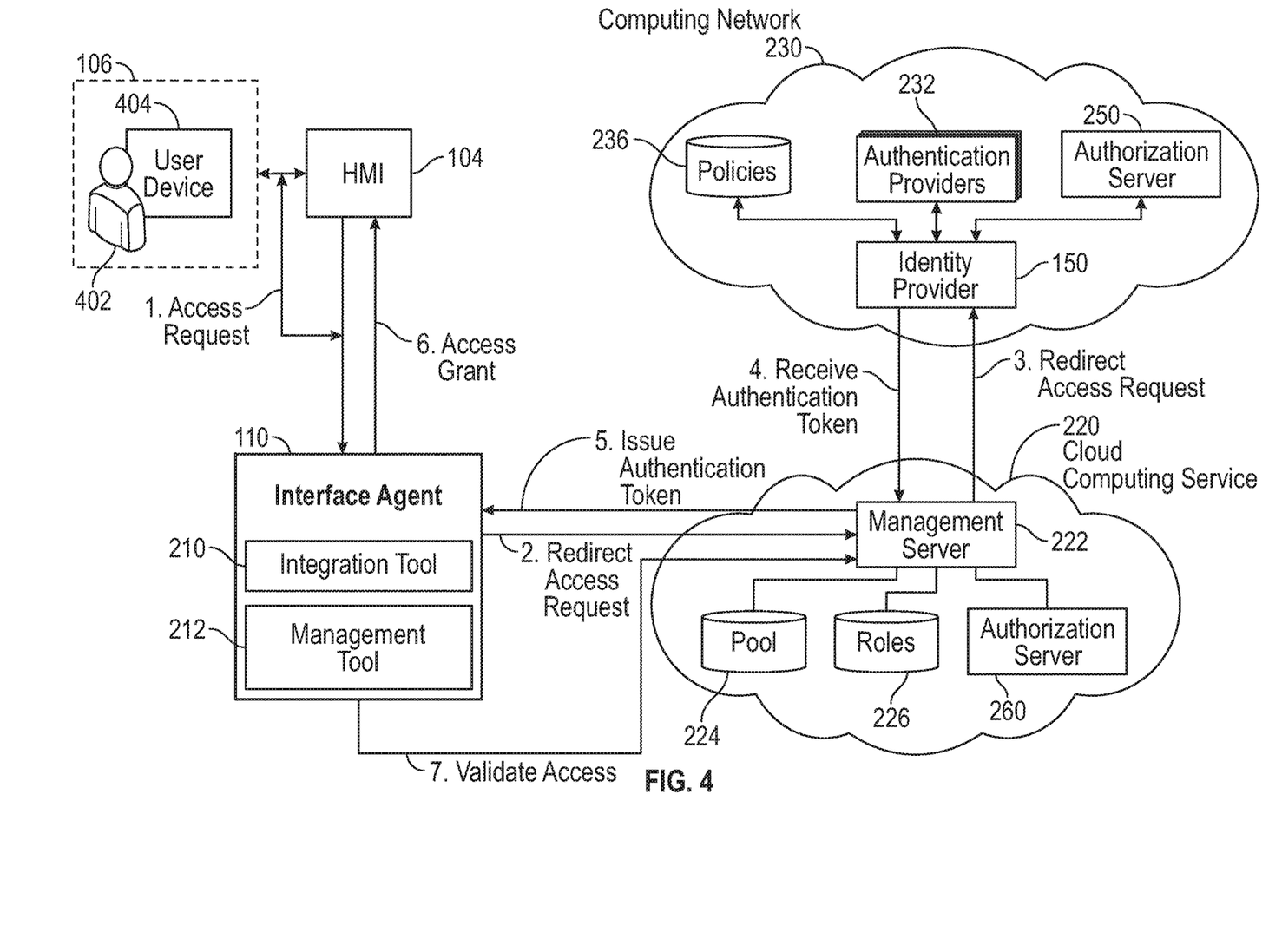
FIG. 4 is a block diagram of another example workflow for performing identity-based authentication for an equipment-specific HMI, according to one embodiment.

FIG. 4 is a block diagram of another example workflow for performing identity-based authentication for an equipment-specific HMI, according to one embodiment. In this particular embodiment, the user agent 106 may be an external user 402 (e.g., unaffiliated with the facility 100) and/or a user device 404 used by the user 402. As an example, the user 402 may be an employee of one of the equipment manufacturers that is attempting to service a particular equipment 102. Here, the user agent 106 interacting with an HMI 104 for a specific equipment 102 may request access to the equipment 102, via the HMI 104 (step 1). In step 2, the interface agent 110 intercepts the access request and re-directs the request to the management server 222. As noted, the management server 222 can determine whether the user 402 belongs to a user pool 224 and/or a role of the user 402 (e.g., based on roles 226) can submit the access request to the identity provider 150. In step 4, the management server 222 receives an authentication token from the identity provider 150, e.g., after the identity provider 150 authenticates the user agent 106.

In step 5, the management server 222 issues the authentication token (or another token, such as an access token, based on the authentication token received in step 4) to the interface agent 110. The authentication token received in step 5 can include the user agent attributes, which enable the HMI 104 to perform downstream authorizations for the user agent 106 to the equipment 102. In step 6, the interface agent 110 grants the user access to the equipment 102, via the HMI. In step 7, the interface agent 110 can interact with the management server 222, in order to validate the user's access (e.g., verifying that the token is still valid, the user is listed in the user pool, etc.).

Figure 5:
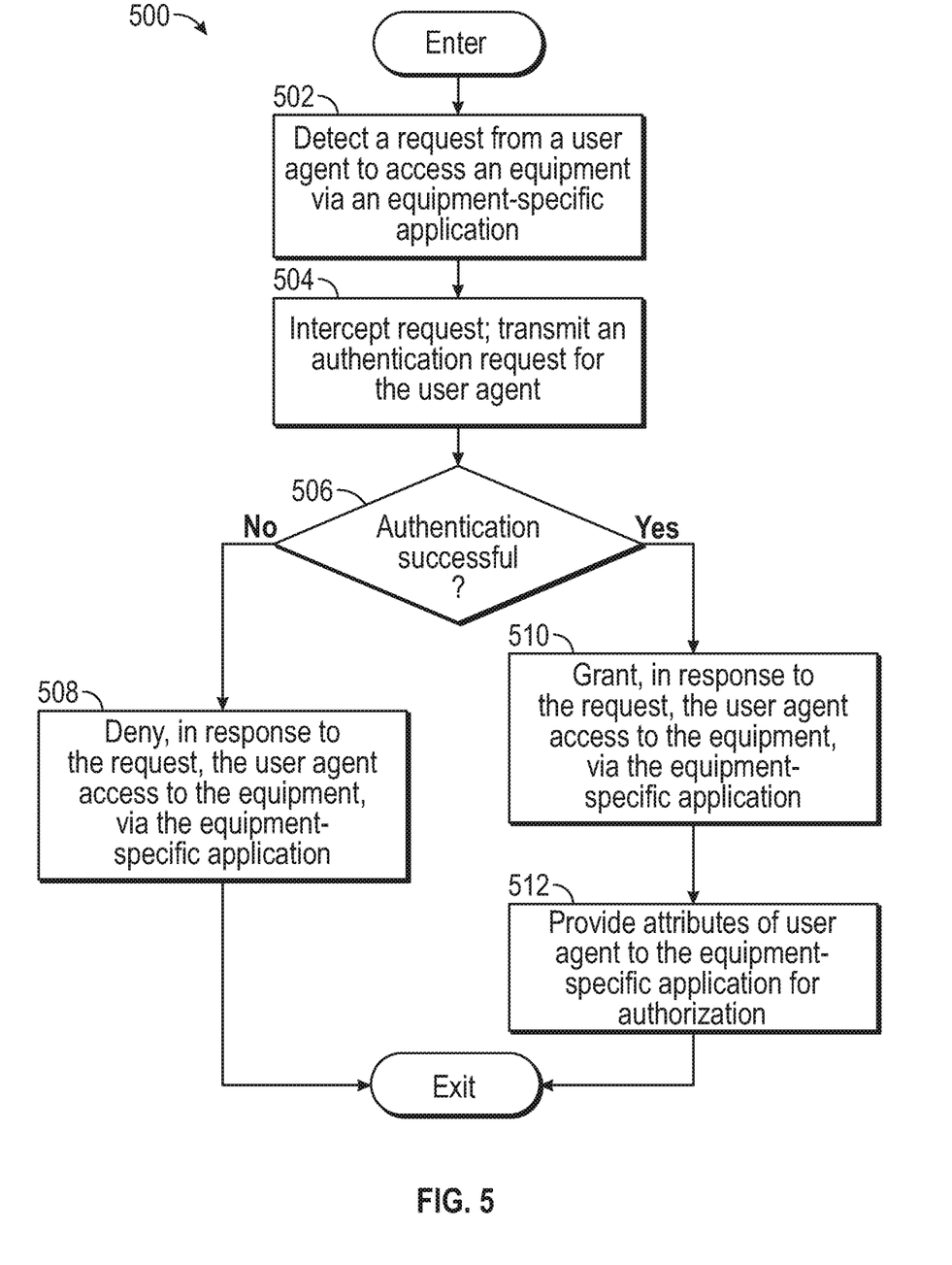
FIG. 5 is a flowchart of a method for performing identity-based authentication for an equipment-specific HMI, according to one embodiment.

FIG. 5 is a flowchart of a method 500 for performing identity-based authentication of a user agent 106 attempting to access an equipment 102 via an equipment specific HMI 104, according to one embodiment. The method 500 may be performed by an interface agent (e.g., interface agent 110). In one embodiment, the interface agent may be installed (e.g., as a plug-in) on the equipment-specific HMI 104.

The method 500 begins at block 502, where the interface agent detects a request from a user agent (e.g., user agent 106) to access an equipment (e.g., equipment 102) via an equipment-specific application (e.g., equipment-specific HMI 104). As discussed above, the interface agent can monitor events on the HMI and detect, via a hook, when the user agent is attempting to access the equipment. At block 504, the interface agent intercepts the access request and transmits an authentication request on behalf of the user to another computing system. In one embodiment, the interface agent may submit the authentication request directly to an identity provider (e.g., identity provider 150), e.g., as shown in FIG. 3. In another embodiment, the interface agent may submit the authentication request to a system (e.g., management server 222) that maintains a user pool (e.g., pool 224) of external users. At block 504, the interface agent can submit the authentication request according to an authentication protocol (e.g., OpenID connect, SAML, etc.).

In one embodiment, the interface agent (at block 504) may redirect and transmit the authentication request, based in part on a type of the user agent (e.g., user, device, etc.). For example, if the interface agent determines that the user agent is a device, the interface agent may make an OCSP call (e.g., to an OCSP responder) in order to redirect the authentication request. In another example, if the interface agent determines the user agent is an Internet-of-Things (IoT) device, the interface agent may redirect the authentication request using Message Queuing Telemetry Transport (MQTT) or another connection less-based protocol. In yet another example, if the interface agent determines the user agent is a user (e.g., user 302/402), the interface agent may redirect the authentication request using one of Hypertext Transfer Protocol Secure (HTTPS) (e.g., based on Secure Socket Layer (SSL), Transport Layer Security (TLS), etc.)). In one embodiment, the communication protocol that is used to re-direct (e.g., generate and transmit) the request to authenticate the user may be selected by a function that is executed in response to a trigger from an API hook (or method).

At block 506, the interface agent 110 determines whether the authentication of the user agent is successful, e.g., depending on the authentication protocol being implemented. In one embodiment, for example, the interface agent 110 may receive an access token (e.g., JSON web token (JWT)) from the identity provider 150, assuming the authentication of the user agent is successful. If the authentication of the user agent is successful, the interface agent grants, in response to the request, the user agent access to the equipment, via the equipment-specific application (block 510). For example, the interface agent can send the access token to the equipment-specific application. At block 512, the interface agent provides attributes of the user agent to the equipment-specific application for downstream authorization. For example, the authentication token received by the interface agent and sent to the equipment-specific application can include one or more attributes of the user agent (e.g., from an authorization server). If the authentication of the user agent is unsuccessful, the interface agent denies, in response to the request, the user access to the equipment, via the equipment-specific application (block 508).

Figure 6:
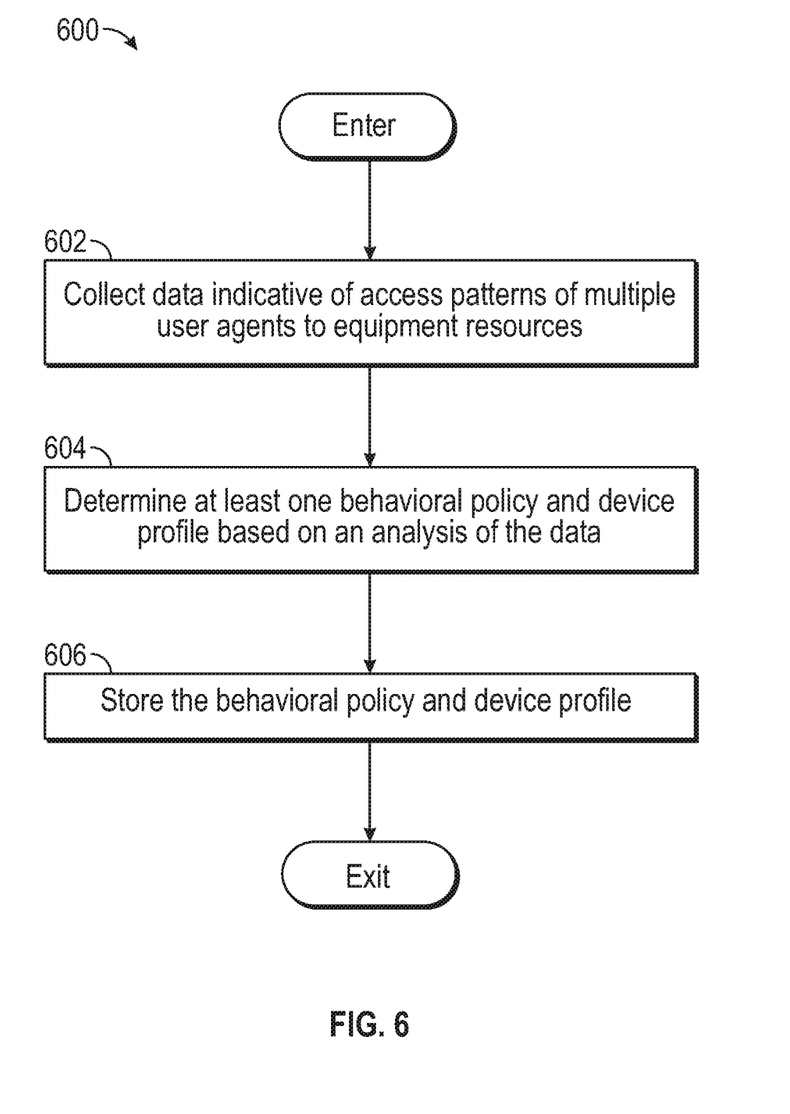
FIG. 6 is a flowchart of a method for monitoring user activity and access patterns to equipment, according to one embodiment.

FIG. 6 is a flowchart of a method 600 for monitoring user activity and access patterns to equipment, according to one embodiment. The method 600 may be performed by an interface agent (e.g., interface agent 110).

As shown, the method 600 begins at block 602, where the interface agent collects data indicative of access patterns of multiple user agents to equipment resources. For example, the interface agent can monitor when and how each user connects to a particular equipment 102 over a period of time (e.g., hours, days, weeks, etc.). The interface agent can determine at least one of: when the equipment 102 was accessed, who accessed the equipment 102, what resources (configuration settings) of the equipment 102 were accessed, frequency of access to configuration settings of the equipment 102, operating conditions of the facility 100 (and/or the equipment 102) when the configuration settings were accessed, job or role of the user, access of the user versus their peers, and the configuration of the device used to access the resources. At block 604, the interface agent determines at least one behavioral policy and/or device profile based on an analysis of the data. For example, the interface agent can evaluate the collected data and determine at least one of a normal access pattern for when and how an equipment 102 should be accessed. In one embodiment, the interface agent can evaluate the data using one or more machine learning applications to determine the behavioral policy and/or device profile. In one embodiment, the interface agent may determine a behavioral policy for each user agent or for a group of user agents. The group of user agents may have a common set of attributes, such as a common time the user agents are in the facility, a common set of permissions, similar roles, etc.

At block 606, the interface agent stores the at least one behavioral policy (e.g., in a database). In one embodiment, the interface agent may store at least a portion of the data and/or the behavioral policy on the same computing system on which the interface agent is located. In another embodiment, the interface agent may store at least a portion of the data and/or the behavioral policy in another storage location (e.g., in the cloud). For example, in this case, the interface agent can move data from an on-premises storage location to the cloud as the interface agent collects data from users.

Figure 7:
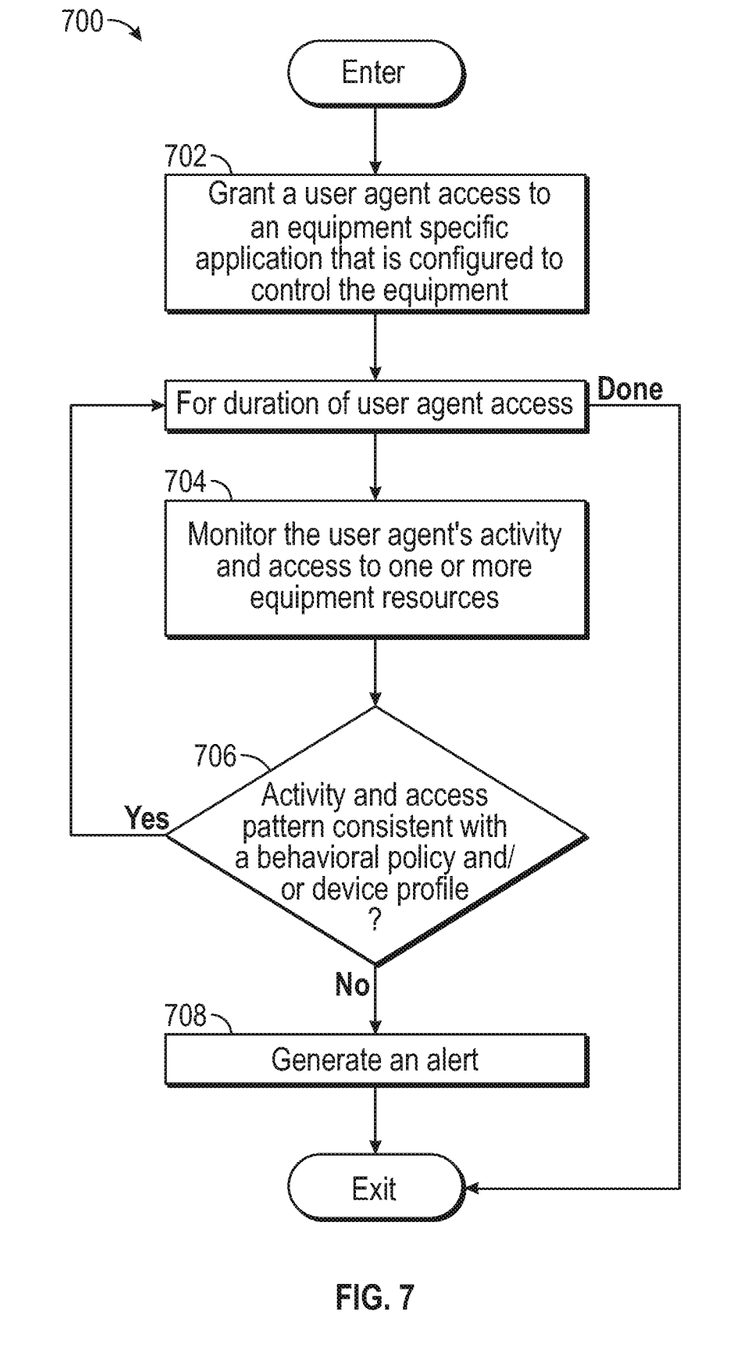
FIG. 7 is a flowchart of a method for detecting anomalous activity on an equipment, according to one embodiment.

FIG. 7 is a flowchart of a method 700 for detecting anomalous activity on an equipment, according to one embodiment. The method 700 may be performed by an interface agent (e.g., interface agent 110).

The method 700 begins at block 702, where the interface agent grants a user agent access to an equipment-specific application (e.g., equipment-specific HMI) that is configured to control the equipment (e.g., equipment 102). For a duration of the user agent access, the interface agent monitors the user agent's activity and access to one or more of the equipment's resources (e.g., configuration settings or parameters).

At block 706, the interface agent determines whether the user agent's activity and access pattern is consistent with a user behavioral policy and/or device profile. For example, if the user agent (e.g., a user) is accessing an equipment during a period of time that differs from that user's previous access or other users access to that equipment, the interface agent can determine that the user agent's behavior is inconsistent with the behavioral policy (and indicates anomalous behavior). In another example, the interface agent may determine the user agent's behavior is inconsistent with a behavioral policy if the user agent is accessing configuration settings that are typically accessed in cases of failure and no failure condition is present. In yet another example, the interface agent may determine the user agent's behavior is inconsistent with a behavioral policy if the user is accessing the equipment from a certain device (or type of device) that is inconsistent with previous devices the user has used to access the equipment. In yet a further example, the interface agent may determine the user agent's behavior is inconsistent with a behavioral policy if the user is accessing the equipment using an unsanctioned device or a device that is outside of an authorized geographical area.

If the interface agent determines the user agent is inconsistent with the behavioral policy and/or device profile, the interface agent can trigger an investigation of the user's behavior, e.g., by generating an alert (block 708). On the other hand, the interface agent continues to monitor the user agent's activity (blocks 706-708) until an end of the user agent's access.

Figure 8:
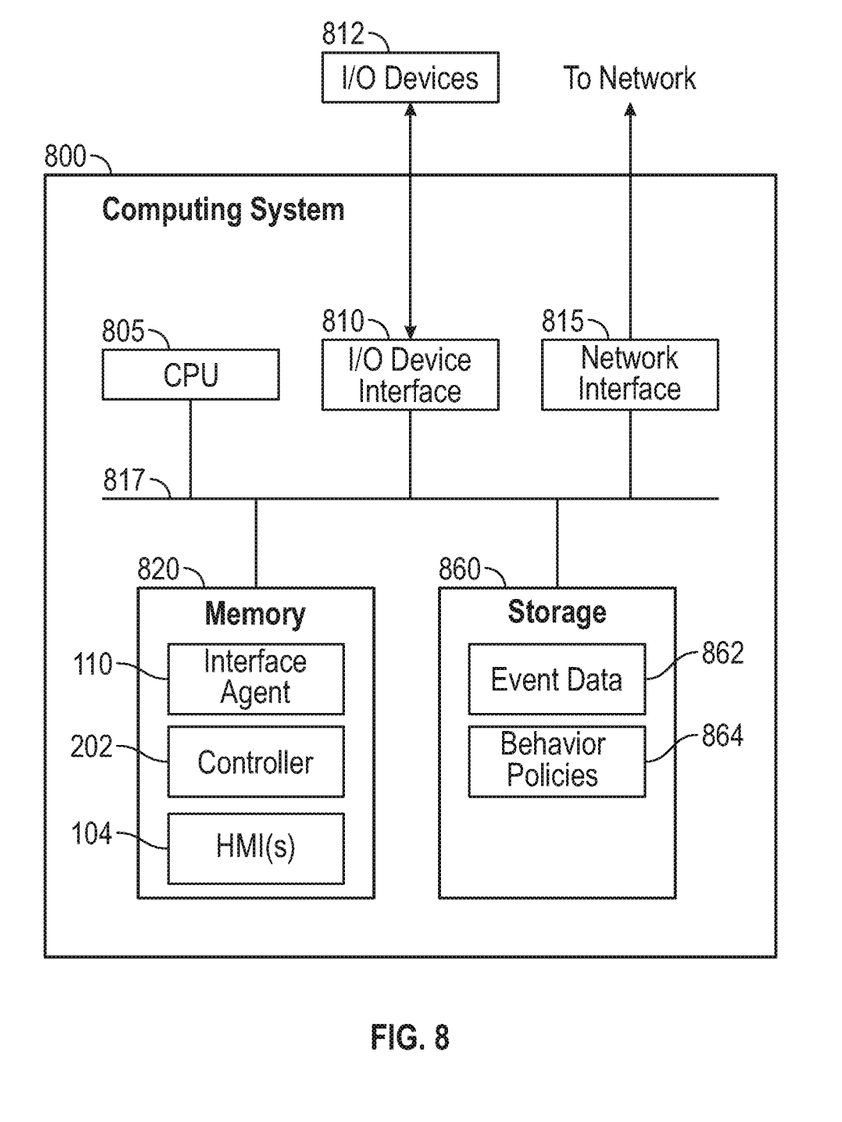
FIG. 8 depicts an example computing system with an interface agent, according to one embodiment.

FIG. 8 illustrates a computing system 800 configured with an interface agent 100, according to one embodiment. As shown, the computing system 800 includes, without limitation, a central processing unit (CPU) 805, a network interface 815, a memory 820, and storage 860, each connected to a bus 817. The computing system 800 may also include an I/O device interface 810 connecting I/O devices 812 (e.g., keyboard, mouse, and display devices) to the computing system 800. Further, in context of this disclosure, the computing elements shown in the computing system 800 may correspond to a physical computing system (e.g., a system in a data center) or may be a virtual computing instance executing within a computing cloud. In one embodiment, the computing system 800 can be an example of the computing system illustrated in FIG. 2 (e.g., controller 202).

The CPU 805 retrieves and executes programming instructions stored in the memory 820 as well as stores and retrieves application data residing in the memory 820. The interconnect 817 is used to transmit programming instructions and application data between CPU 805, I/O devices interface 810, storage 860, network interface 815, and memory 820. Note CPU 805 is included to be representative of a single CPU, multiple CPUs, a single CPU having multiple processing cores, and the like. Memory 820 is generally included to be representative of a random access memory. The storage 860 may be a disk drive storage device. Although shown as a single unit, storage 860 may be a combination of fixed and/or removable storage devices, such as fixed disc drives, removable memory cards, or optical storage, network attached storage (NAS), or a storage area-network (SAN). The storage 860 includes event data 862 and behavioral policies 864, which are discussed in more detail above. Illustratively, the memory 820 includes the interface agent 110, HMI 104, and the controller 202, which are described in more detail above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user agent may access applications (e.g., identity provider 150, management server 222, etc.) or related data available in the cloud. For example, the identity provider 150 could execute on a computing system in the cloud and interact with the interface agent 110 in order to provide identity-based authentication for a user agent on behalf of an equipment-specific HMI. In another example, the management server 222 could execute on a computing system in the cloud and interact with the interface agent 110 in order to provide identity-based authentication for a user agent on behalf of an equipment-specific HMI. Doing so allows a user agent to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer-readable storage medium storing instructions, which, when executed on a computing system, perform an operation for identity-based authentication of a user agent attempting to access an equipment, the operation comprising:
   detecting, via a human machine interface (HMI) application configured to control the equipment, a request from the user agent to access a configuration of the equipment, the HMI application being initially configured with a first authentication mechanism, wherein the first authentication mechanism is an internal entity that uses a native authentication mechanism configured to provide the user agent access to one of a predefined number of accounts based on a credential for the account shared with one or more additional user agents;
   in response to the detection:
      refraining from authenticating the user agent with the first authentication mechanism; and
      re-directing the request from the first authentication mechanism to a different second authentication mechanism provided by an identity provider, wherein the second authentication mechanism is an identity-based authentication mechanism that is configured to provide the user agent access to the equipment based on a credential uniquely associated with the user agent and wherein the identity provider is an external entity;
   determining, after re-directing the request to the identity provider, that the user agent has been successfully authenticated using the second authentication mechanism, wherein determining that the user agent has been successfully authenticated comprises receiving an access token comprising one or more attributes used for authorizing the user agent;
   determining one or more parameters of the configuration of the equipment that the user agent is authorized to access, based on the access token; and
   providing, via the HMI application in response to the request to access the equipment, an access grant comprising the one or more attributes and authorizing the user agent to access the one or more parameters of the configuration of the equipment, after determining that the user agent has been successfully authenticated using the second authentication mechanism.

2. The computer-readable storage medium of claim 1, wherein the identity provider performs authentication based on one or more authentication protocols and the second authentication mechanism is based on one of the one or more authentication protocols.

3. The computer-readable storage medium of claim 2, wherein the one or more authentication protocols comprise OpenID Connect and Security Assertion Markup Language (SAML).

4. The computer-readable storage medium of claim 1, wherein:
   determining that the user agent has been successfully authenticated further comprises validating the access token for the user agent; and
   the user agent is at least one of a user or a computing device used by the user to interact with the HMI application.

5. The computer-readable storage medium of claim 1, wherein the equipment comprises a material handling equipment (MHE) deployed in an order fulfillment center.

6. A computer-implemented method for performing identity-based authentication of a user attempting to access an equipment, the computer-implemented method comprising:
   detecting, via an application configured to control the equipment, an attempt by the user to access a configuration of the equipment, wherein the application is initially configured with an internal entity that uses a native authentication mechanism to provide access to one of a predefined number of accounts based on a credential for the account shared with one or more additional users;
   in response to the detection:
      refraining from using the native authentication mechanism to authenticate the user; and
      transmitting, on behalf of the application, a request to authenticate the user to a computing system that provides authentication as a service, wherein the authentication as a service uses an identity-based authentication mechanism, different from the native authentication mechanism, to provide the user access to the equipment based on a credential uniquely associated with the user and wherein the computing system is an external entity;

determining, after transmitting the request to the computing system, that the user has been successfully authenticated by the computing system, comprising receiving an access token comprising one or more attributes used for authorizing the user;

determining one or more parameters of the configuration of the equipment that the user is authorized to access, based on the access token; and providing, via the application and in response to the request to access the equipment, an access grant comprising the one or more attributes and authorizing the user to access the one or more parameters of the configuration of the equipment, after determining that the user has been successfully authenticated by the computing system.

7. The computer-implemented method of claim 6, wherein authenticating the user comprises authenticating a computing device that permits the user to send the attempt to access the configuration of the equipment.

8. The computer-implemented method of claim 6, further comprising providing an application programming interface (API) hook configured to at least monitor for access attempts to the configuration of the equipment, wherein the attempt by the user to access the configuration of the equipment is detected via the API hook.

9. The computer-implemented method of claim 8, wherein:

the API hook triggers execution of a function configured to generate and transmit the request to authenticate the user to the computing system; and the function is configured to use one of a plurality of communication protocols to generate and transmit the request, based in part on a type of access attempt by the user.

10. The computer-implemented method of claim 9, wherein the communication protocol is a certificate-based status communication protocol if the application detects the attempt to access the configuration of the equipment from a computing device of the user.

11. The computer-implemented method of claim 9, wherein:

the communication protocol is a connectionless communication protocol if the application detects the attempt to access the configuration of the equipment from a computing device of the user; and the computing device is an Internet-of-Things (IoT) device.

12. The computer-implemented method of claim 9, wherein the communication protocol is based on a Hypertext Transfer Protocol if the application detects the attempt to access the configuration directly from the user.

13. The computer-implemented method of claim 6, wherein determining that the user has been successfully authenticated comprises determining that the user has been authenticated via a multi-factor authentication system.

14. The computer-implemented method of claim 6, wherein:

the equipment is located in a facility comprising a plurality of other equipment; and the computing system is an identity provider used for authenticating users associated with the facility.

15. The computer-implemented method of claim 6, wherein the computing system is an identity provider used for authenticating users associated with a manufacturer of the equipment.

16. The computer-implemented method of claim 6, further comprising:

monitoring activity of the user to the configuration of the equipment; and determining, based on the monitoring, one or more events that occur while the user is accessing the configuration of the equipment; and saving the one or more events.

17. The computer-implemented method of claim 6, the computer-implemented method further comprising verifying that the access token is valid after providing the access grant to access the one or more parameters of the configuration of the equipment.

18. A system comprising:

at least one processor; and a memory storing instructions, which, when executed by the at least one processor, perform an operation for identity-based authentication of a user attempting to access an equipment, the operation comprising:

detecting, via an application configured to control the equipment, an attempt by the user to access a configuration of the equipment, wherein the application is initially configured with an internal entity that uses a native authentication mechanism to provide access to one of a predefined number of accounts based on a credential for the account shared with one or more additional users;

in response to the detection:

refraining from using the native authentication mechanism to authenticate the user; and transmitting, on behalf of the application, a request to authenticate the user to a computing system that provides authentication as a service, wherein the authentication as a service uses an identity-based authentication mechanism, different from the native authentication mechanism, to provide the user access to the equipment based on a credential uniquely associated with the user and wherein the computing system is an external entity;

determining, after transmitting the request to the computing system, that the user has been successfully authenticated by the computing system, comprising receiving an access token comprising one or more attributes used for authorizing the user;

determining one or more parameters of the configuration of the equipment that the user is authorized to access, based on the access token; and providing, via the application and in response to the request to access the equipment, an access grant comprising the one or more attributes and authorizing the user to access the one or more parameters of the configuration of the equipment, after determining that the user has been successfully authenticated by the computing system.

19. The system of claim 18, wherein authenticating the user comprises authenticating a computing device that permits the user to send the attempt to access the configuration of the equipment.

20. The system of claim 18, wherein determining that the user has been successfully authenticated comprises determining that the user has been authenticated via a multi-factor authentication system.

* * * * *